April 28, 1964   W. J. CALDWELL   3,130,486
COMMUTATOR ASSEMBLING MACHINE
Filed Dec. 1, 1960   9 Sheets-Sheet 1

INVENTOR.
WASHINGTON J. CALDWELL
BY
Fabrey, Souther & Stoltenberg
ATTORNEYS

April 28, 1964 W. J. CALDWELL 3,130,486
COMMUTATOR ASSEMBLING MACHINE
Filed Dec. 1, 1960 9 Sheets-Sheet 2

INVENTOR.
WASHINGTON J. CALDWELL
BY
*Falvey, Souther & Stollenberg*
ATTORNEYS

April 28, 1964     W. J. CALDWELL     3,130,486
COMMUTATOR ASSEMBLING MACHINE
Filed Dec. 1, 1960                           9 Sheets-Sheet 3
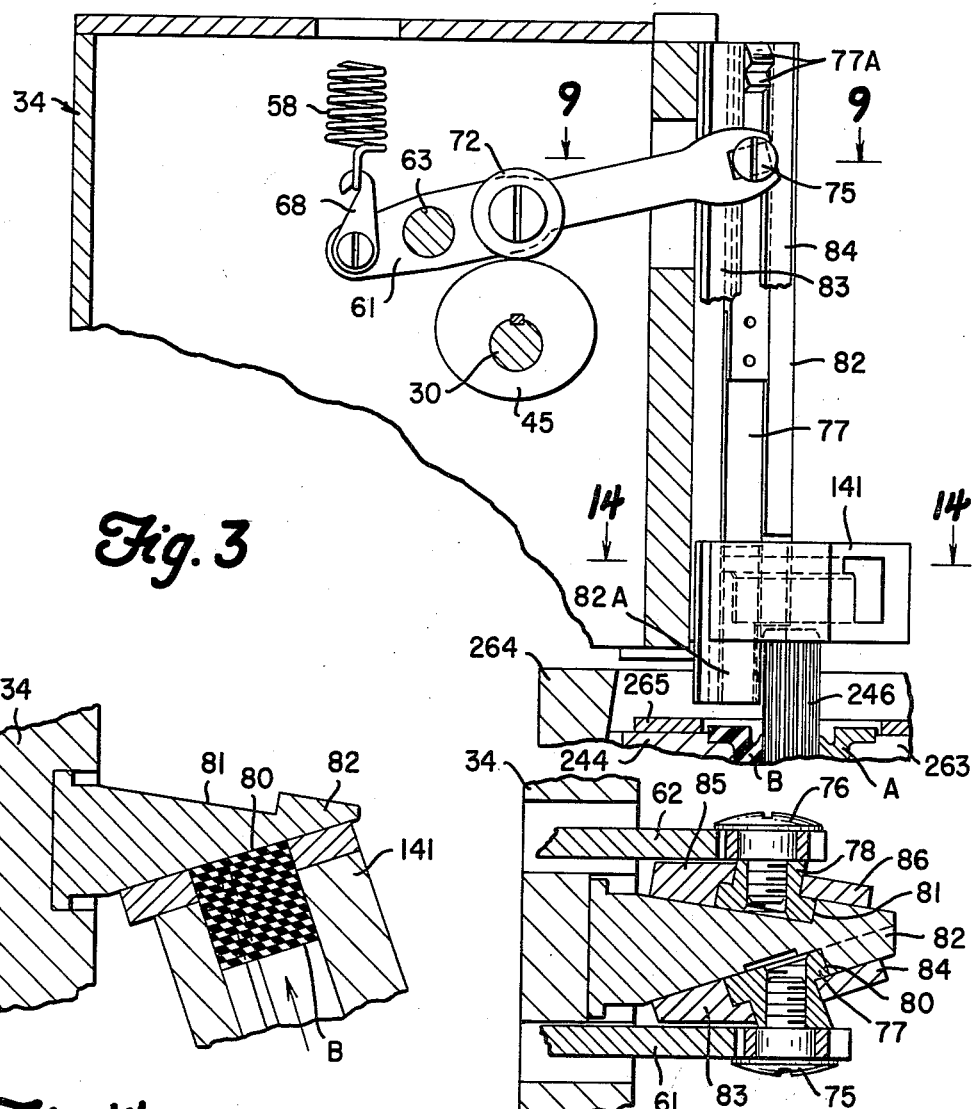
INVENTOR.
WASHINGTON J. CALDWELL
BY
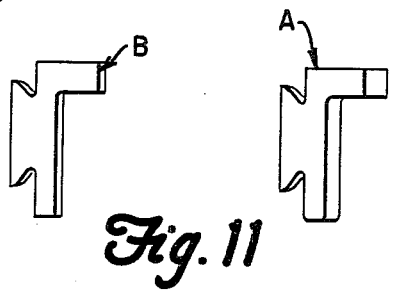
ATTORNEYS

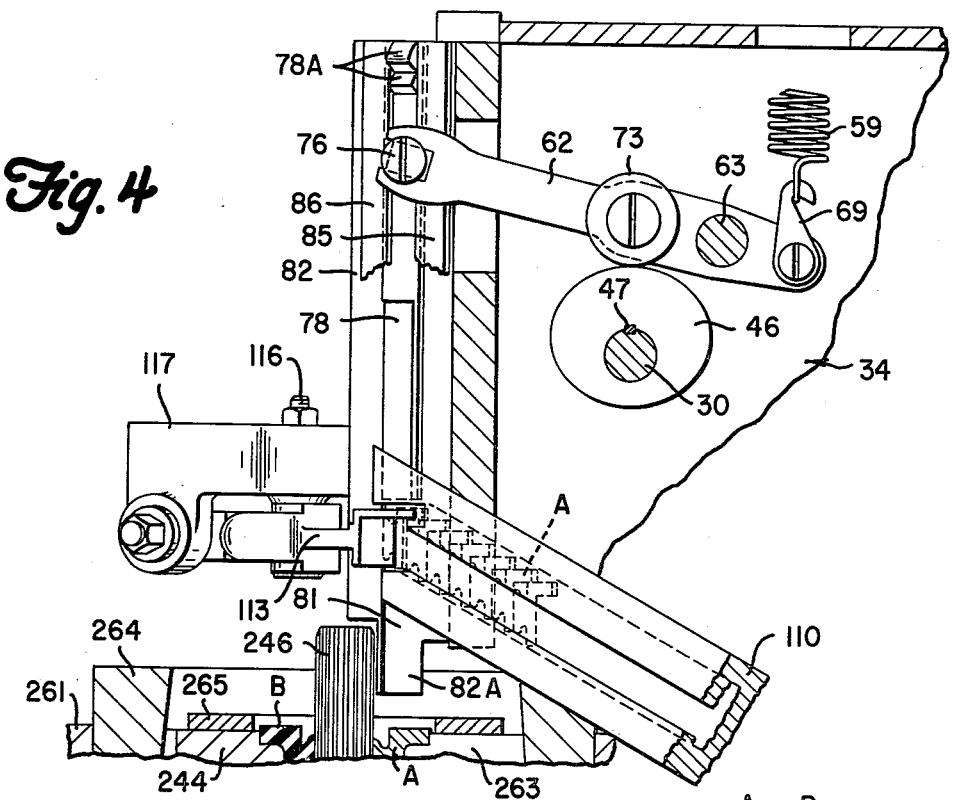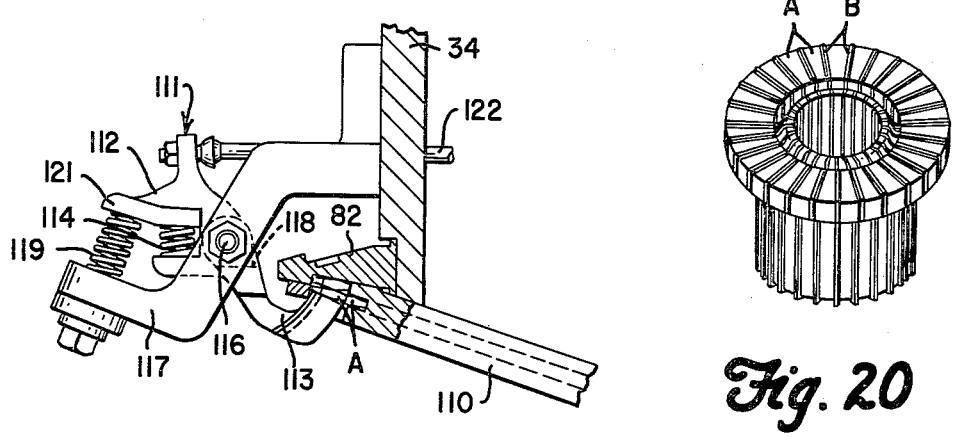

*INVENTOR.*
WASHINGTON J. CALDWELL
BY
*Falvey, Souther & Stoltenberg*
ATTORNEYS

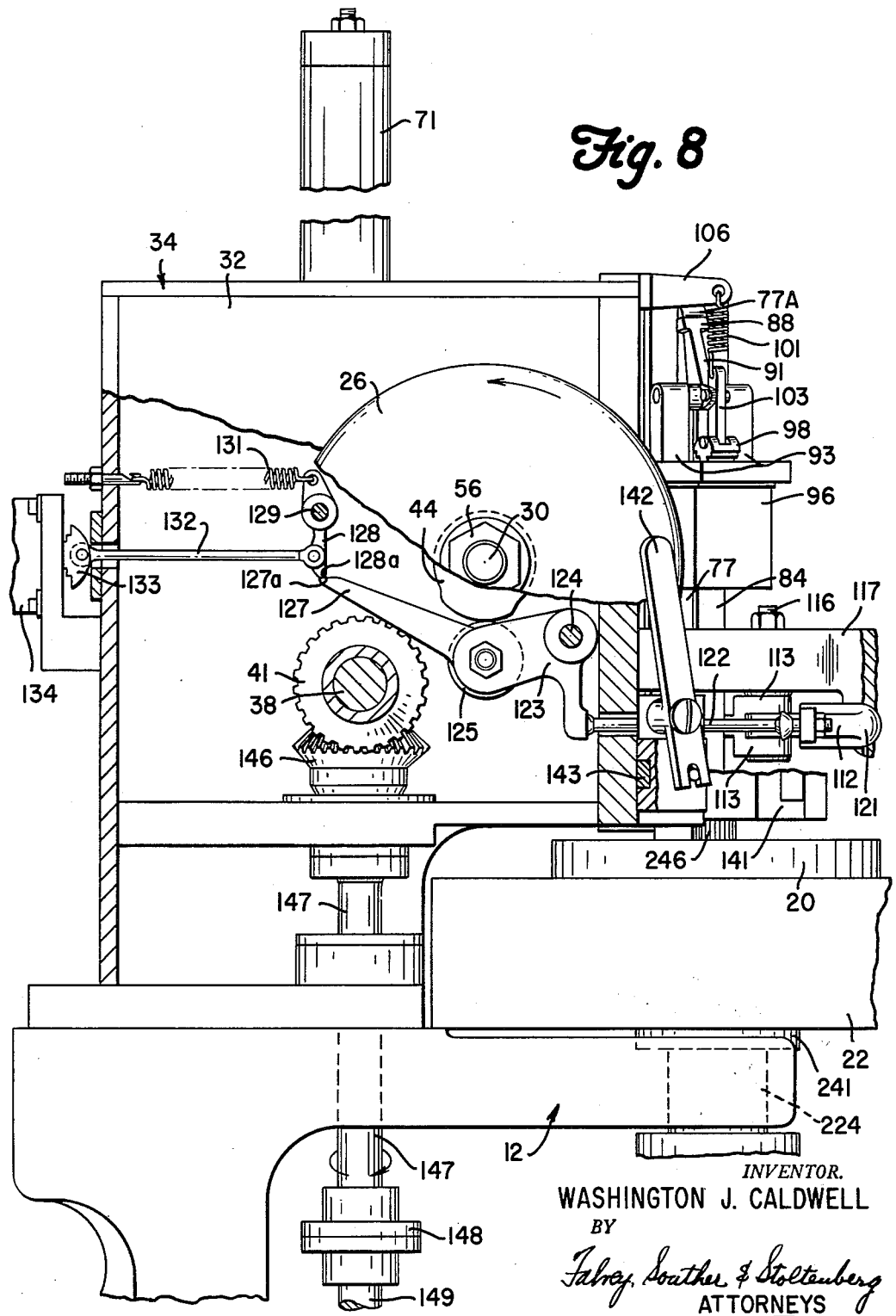

April 28, 1964  W. J. CALDWELL  3,130,486
COMMUTATOR ASSEMBLING MACHINE
Filed Dec. 1, 1960  9 Sheets-Sheet 7

INVENTOR.
WASHINGTON J. CALDWELL
BY
Falvey, Souther & Stoltenberg
ATTORNEYS

April 28, 1964  W. J. CALDWELL  3,130,486
COMMUTATOR ASSEMBLING MACHINE
Filed Dec. 1, 1960  9 Sheets-Sheet 8
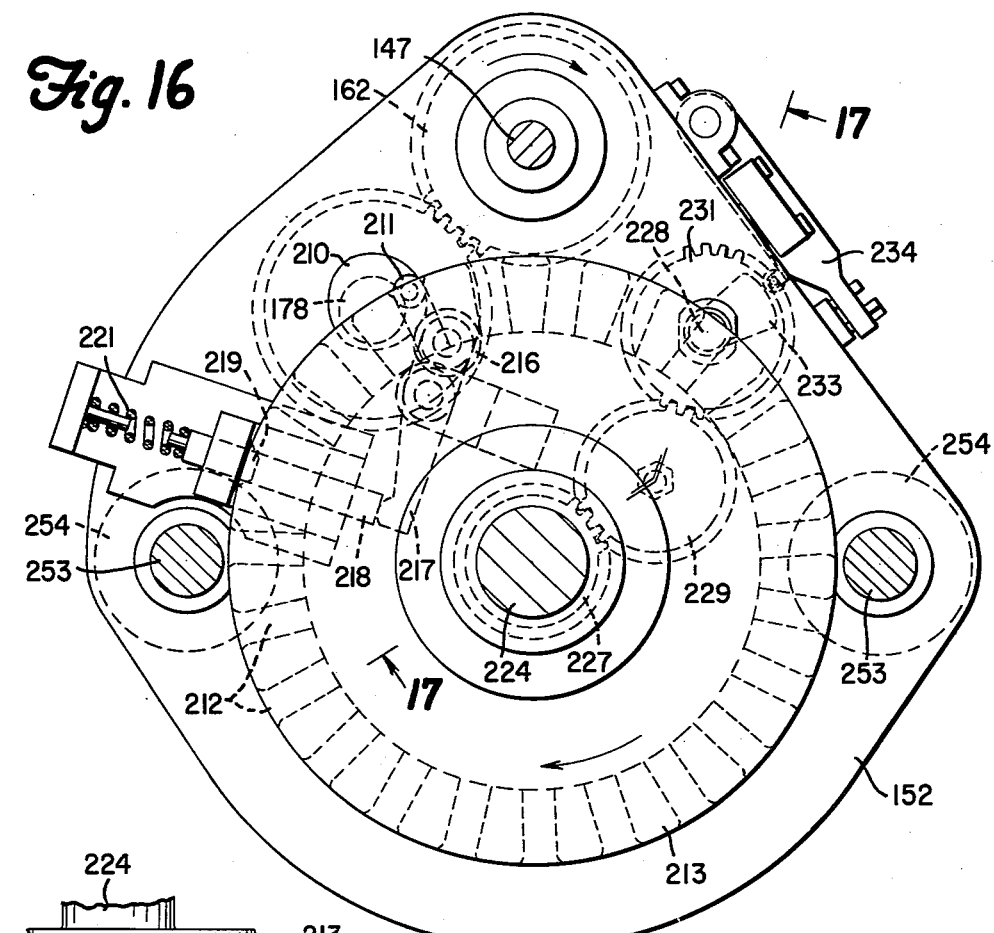
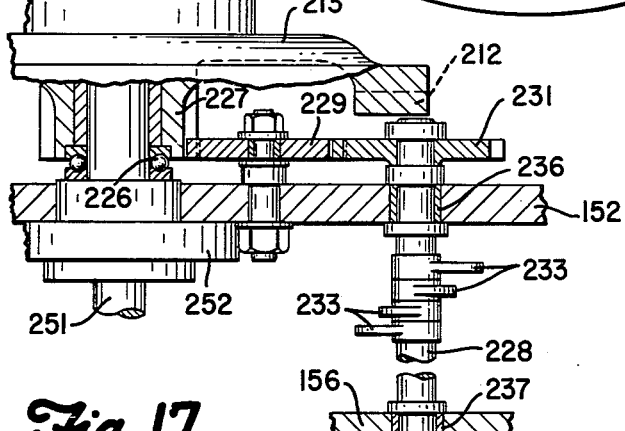
INVENTOR.
WASHINGTON J. CALDWELL
BY
Falvey, Souther & Stoltenberg
ATTORNEYS April 28, 1964  W. J. CALDWELL  3,130,486
COMMUTATOR ASSEMBLING MACHINE
Filed Dec. 1, 1960  9 Sheets-Sheet 9

INVENTOR.
WASHINGTON J. CALDWELL
BY
Falvey, Souther & Stoltenberg
ATTORNEYS

United States Patent Office 3,130,486
Patented Apr. 28, 1964

3,130,486
COMMUTATOR ASSEMBLING MACHINE
Washington J. Caldwell, Garden City, Mich., assignor to Eltra Corporation, Toledo, Ohio, a corporation of New York
Filed Dec. 1, 1960, Ser. No. 73,065
7 Claims. (Cl. 29—205)

This invention relates to a commutator assembly machine and more particularly to a machine for positioning copper segment bars in assembled relation with alternating mica insulating elements to fabricate a commutator.

The invention embraces a machine for and method of assembling conducting and insulating components of a dynamoelectric machine commutator into a special holding means that will retain the assembled components in assembled relation during a series of subsequent operations performed by other and different types of machines which will ultimately produce a completely fabricated dynamoelectric machine commutator.

The invention contemplates the provision of a machine capable of continuous operation to automatically insert a predetermined number of hopper fed copper segment bars in related alternate positions with a predetermined number of magazine-fed mica insulating segments into a special holding fixture which is adapted to cooperate with various other machines to perform further operations to produce a dynamoelectric machine commutator.

The invention further contemplates the provision of a machine for assembling commutator conducting and insulating elements wherein a special holding fixture is provided having radially aligned guide slots in which the insulating elements are inserted and maintained in a vertical position; the vertically positioned insulating elements providing a means of guiding the copper conducting elements of the commutator into the holding fixture to retain them in assembled vertical position for subsequent operations.

The invention comprehends a machine for assembling electrical conducting and insulating elements of a dynamoelectric machine commutator which can be adapted to assemble elements having varying configurations for various types of dynamoelectric machines or assemble various numbers of elements to accommodate various sizes of dynamoelectric machines.

In the past, a manual or hand method has been used to assemble the conducting and insulating elements of a commutator. This method is unsatisfactory in a mass production system because of the costly man hours involved to produce the vast number of commutators required. Another disadvantage of the manual method is the number of rejections as a result of improper assembling of the conducting and insulating elements, either in the number of segments assembled or the relative positions of the segments, which also is costly. With modern mass production methods and/or machinery producing various other components of dynamoelectric machines it was found necessary to also provide a more efficient and inexpensive method of producing the commutator component.

It is, therefore, a principal object of this invention to provide a means for automatically assembling electrical conducting and insulating elements for fabricating dynamoelectric machine commutators, thereby providing a more efficient and more economical method of producing commutators.

It is another object of this invention to provide an automatic machine which is capable of positioning a predetermined number of conducting and insulating commutator segments for a commutator in relative operative position in a special holding fixture.

It is another object of the invention to provide an automatic assembling machine for commutators having a continuous feed system of the commutator elements which allows continuous automatic operation of the machine while it is assembling the commutator conducting and insulating segments into operative relation.

It is another object of the invention to provide a machine for assembling commutator-conducting and insulating segments in a special holding fixture which is adapted to maintain the assembled segments so that they can be moved to various machines for subsequent assembling operations in a mass production line.

It is still another object of the invention to provide an automatic machine that can be adapted to assemble any given number of segments, or segments having any given configuration.

Other objects and advantages of this invention relating to the arrangement, operation and function of the related elements of the structure, to various details of construction, to combinations of parts and to economies of manufacture will be apparent to those skilled in the art upon consideration of the following description and appended claims, reference being had to the accompanying drawings forming a part of this specification wherein like reference characters designate corresponding parts in the several views.

Referring to the drawings:

FIG. 3 is a sectional elevation showing the mica segment inserting mechanism;

FIG. 4 is a sectional elevation showing the copper segment inserting mechanism;

FIG. 8 is a side elevation, partly in section, showing a portion of the inserting mechanism;

FIG. 9 is an enlarged sectional view, taken on line 9—9 of FIG. 3, showing the inserting bars and their guide means;

FIG. 10 is an isometric view of a mica-insulating commutator segment;

FIG. 11 is an isometric view of a copper commutator segment;

FIG. 12 is a fragmentary plan view, partly in section, of the copper segment positioning mechanism;

FIG. 14 is an enlarged sectional view, taken on line 14—14 of FIG. 3, showing the mica-feed means;

FIG. 16 is a plan view of a portion of the indexing mechanism;

FIG. 17 is a fragmentary sectional view taken on line 17—17 of FIG. 16;

FIG. 20 is an isometric view of a commutator body showing the mica and copper segments as assembled by a machine incorporating the present invention.

Figures 1, 17A:
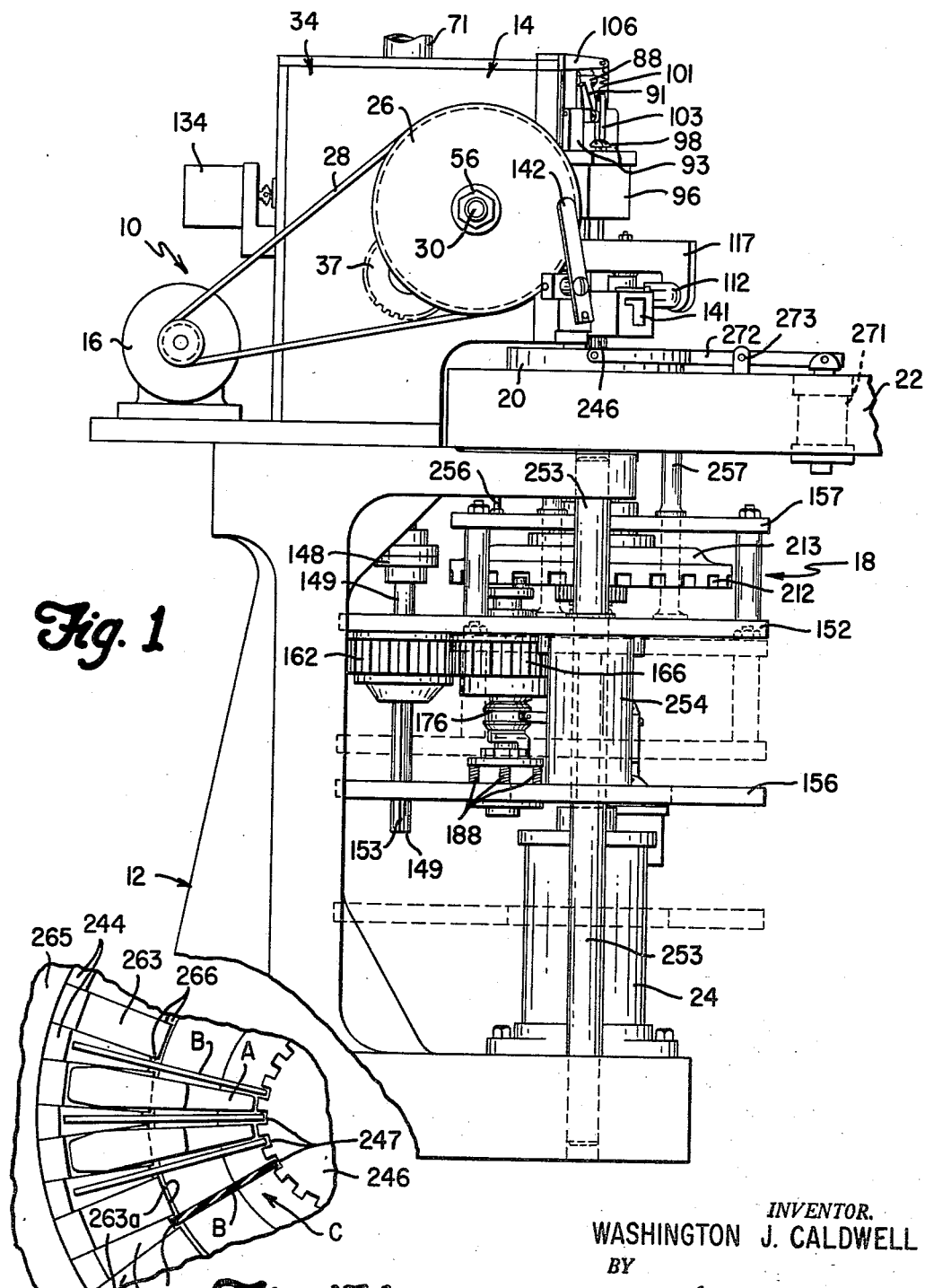
FIG. 1 is a side elevation of the machine incorporating the invention.
FIG. 17A is an enlarged plan view, partly in section, of FIG. 19.

The machine, herein described and illustrated, is constructed to assemble a twenty-seven segment commutator, or, to be more specific, the machine will assemble twenty-seven copper segments and twenty-seven mica segments. It is to be understood that the invention is not limited to manufacture a commutator having a particular number of commutator segments since the same principle may be embodied in a machine capable of assembling any given number of segments as required for a given type or size of dynamoelectric machine. Also, the invention, as disclosed, pertains to segments having an integral leg or riser projecting from the main body portion, which provides the segments with an inverted L-shaped configuration, as shown in the drawings (FIGS. 10 and 11). There are numerous types of dynamoelectric machines which require a commutator constructed of segments which do not have the integral leg, that is, the main body portion is merely a straight bar. This invention is also adaptable to the "straight bar" type of commutator.

Referring to the drawings, and particularly FIG. 1, a machine 10 incorporating the invention is shown comprising a base member 12, an inserting mechanism 14 mounted on the base member, an electric motor 16 for driving the machine, and an indexing mechanism 18. The machine 10 provides a method and a means of assembling commutator copper and mica segments into a holding fixture 20 mounted on a circular rotatable table 22, only a portion of which is shown. After the copper and mica segments are assembled in their relative positions in the holding fixture 20, the rotatable table 22 moves the holding fixture 20 at another machine also cooperating with the periphery of the table, which is designed to perform a further operation on the assembled segments in the holding fixture. The table 22 may be provided with a plurality of holding fixtures positioned adjacent its perimeter in spaced relation which allows a plurality of machines to perform a number of different operations simultaneously at the various stations. The other machines located at the aforementioned spaced stations necessary to complete the finished commutator are not a part of this invention and, therefore, are not shown or described.

In the drawings, the motor 16 provides the driving means for the machine including the inserting mechanism 14 which positions the copper and mica segments in the holding fixture 20, and also provides the driving means for the indexing mechanism 18 which rotates the holding fixture 20, so that the copper and mica segments will be properly positioned in the holding fixture with relation to each other. Another motive means is provided in the form of an air cylinder 24 which raises and lowers the indexing mechanism 18 and allows the table 22 to index the holding fixture 20 to its various operating positions in the machines at the various stations.

Inserting Mechanism

Figure 2:
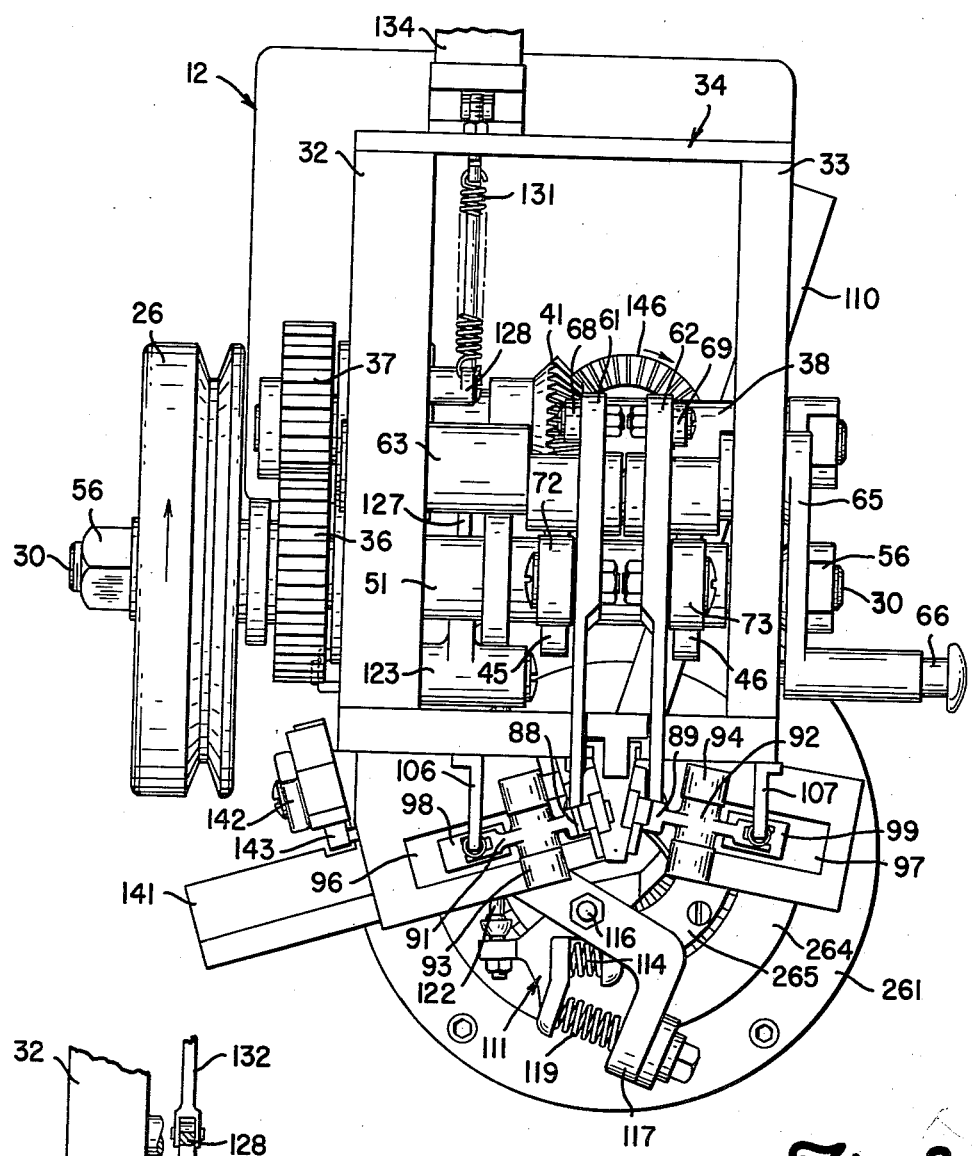
FIG. 2 is a plan view of the machine.
Figure 6:
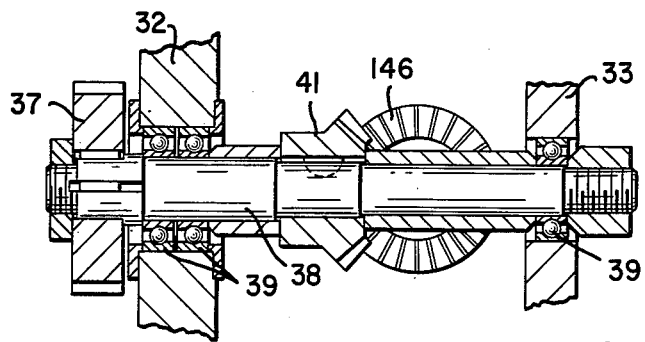
FIG. 6 is a fragmentary sectional view of a power-transmitting shaft.

Referring to FIGS. 1 and 2, the motor 16 transmits rotary motion to a large pulley 26 through a belt 28. The pulley 26 is mounted on a camshaft 30 (FIG. 5) which is journaled in suitable bearings 31, which are mounted in vertical wall members 32 and 33 of a mounting frame 34. Mounted on the shaft 30 is a gear 36 which meshes with and drives a similar gear 37 mounted on a shaft 38 (FIG. 6), which also extends through the mounting frame 34 and is journaled in suitable bearings 39 mounted in the walls 32 and 33. A bevel gear 41 is keyed to the shaft 38 and provides a means of transmitting power to the indexing mechanism 18, which will be described in detail hereinafter.

Figure 7:
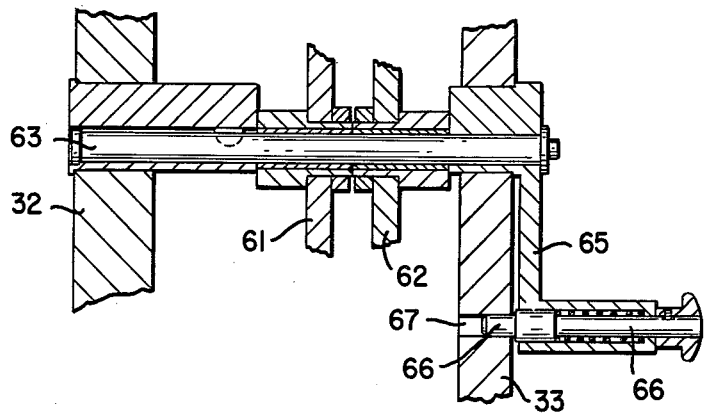
FIG. 7 is a fragmentary sectional view of a shaft assembly including an eccentric pivot which can be relocated manually.
Figure 5:
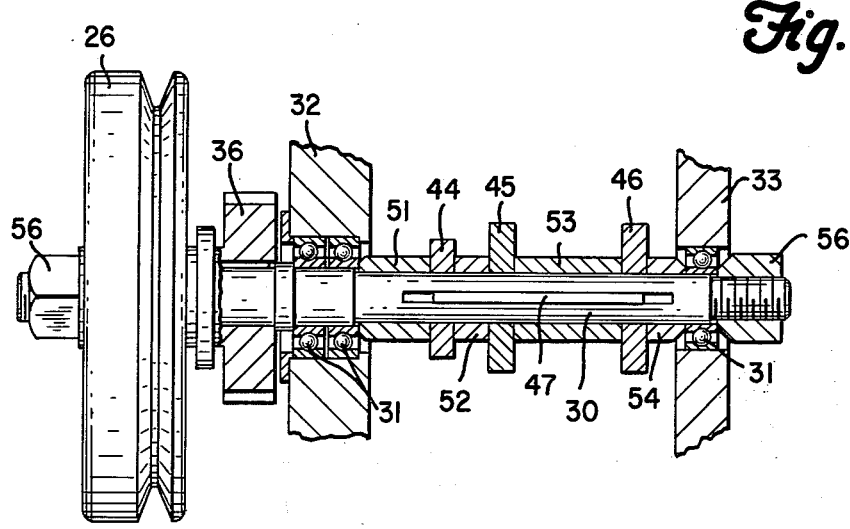
FIG. 5 is a sectional plan view, showing the cam shaft assembly.

The camshaft 30 has affixed thereto three cams 44, 45, and 46 which are maintained in relative angular positions on the shaft with a conventional key and slot assembly as shown at 47 in FIGS. 3, 4, and 5. Spacer tubes 51, 52, 53, and 54 are used to maintain the cams in spaced axial relation and two threaded nuts 56 maintain the various parts assembled on the shaft. Two of the cams 45 and 46 cooperate with two pivoted arms 61 and 62 biased by two large coil springs 58 and 59 (FIGS. 3 and 4) to provide resilient oscillating motion to the pivoted arms 61 and 62, which are mounted on a shaft 63 (FIG. 7) which is also rotatively mounted by adjustable eccentrics in the walls 32 and 33 of the mounting frame 34. Mounting the arms 61 and 62 with an adjustable eccentric pivot provides a means of adjusting the stroke of the oscillating arms and is also convenient to facilitate assembly and disassembly of the machine for repair or replacement of various parts. The shaft 63 has a crank arm 65 mounted at one end which provides a means of rotating the eccentric mounting of the shaft, the crank arm 65 being provided with a handle including a spring-urged plunger 66 which cooperates with a number of apertures 67 positioned in an arcuate locus 33 to maintain the crank arm and the eccentric mounts for the shaft in a predetermined adjusted position.

One end of each of the arms 61 and 62 are provided with hook members 68 and 69, respectively which are pivotally mounted to the arms to provide a means of connecting the coil springs 58 and 59 thereto to obtain the resilient bias mentioned. The opposite ends of the coil springs are anchored to the upper ends of two tubular spring housings 71 mounted on the top of the mounting frame 34, only one of which is shown in FIGS. 1 and 8. The arms are also provided on the opposite side of the pivot shaft 63 with cam followers 72 and 73, rotatively mounted near the center of the arms and cooperate with the cams 45 and 46, respectively, to provide the power stroke. While the cams 45 and 46 urge the arms in a clockwise direction for the power stroke, the springs 58 and 59 resiliently urge the arms in the opposite or counterclockwise direction, maintaining the cam followers in constant contact with their respective cams 45 and 46, and also providing the actuating stroke for the element.

The actuating ends of the arms 61 and 62 are provided with bifurcated portions which cooperate in a scotch-yoke fashion with pintle members 75 and 76 (FIGS. 3, 4 and 9), which are mounted to two vertically-reciprocating inserting bars 77 and 78 which insert the copper and mica segments A and B respectively (FIGS. 10 and 11) into the holding fixture 20. The inserting bars 77 and 78 are reciprocated in angularly positioned guide tracks 80 and 81, respectively, (FIG. 9) provided by a vertical guide member 82 and retaining members 83, 84, 85 and 86. The guide member 82 is suitably mounted to the mounting frame 34, and the retaining members are suitably mounted to the guide member 82. The upper ends of the two inserting bars are provided with tooth-like projections 77A and 78A which cooperate with solenoid-actuated pawls 88 and 89 (FIGS. 2 and 8) to maintain one or the other of the inserting bars in an inoperative position during the operation of the machine, which will be more fully described hereinafter. The pawls 88 and 89 are integral with the bell cranks 91 and 92, respectively, which are pivoted in mounting brackets 93 and 94 mounted to the frame 34. Positioned underneath the mounting brackets 93 and 94 are solenoids 96 and 97 which, when energized, maintain their actuating plungers 98 and 99 in downward positions against the action of coil springs 101 and 102 to which the plungers are connected by links 103 (only one of which is shown in FIG. 8). The actuating arms of the bell cranks 91 and 92 are connected to a central portion of the links 103 as seen in FIG. 8. The opposite ends of the coil springs 101 and 102 are anchored to stationary brackets 106 and 107 also mounted to the frame 34.

A feed magazine 110 (FIGS. 2 and 4) is suitably mounted to the frame 34 for guiding the copper segments A to the guide track 81 from a hopper-fed mechanism not shown. The feed magazine 110 is mounted in an oblique position, so that the copper segments are fed to the machine in the proper position to be inserted into the holding fixture. A means is provided to move the copper segments from the feed magazine 110 to the guide track 81 in the form of a resiliently connected double bell crank assembly 111 (FIG. 12), which comprises two pivotally connected bell cranks 112 and 113, and a compression spring 114. A pivot 116 provides the pivot connection between the cranks and also a means of pivotally mounting the assembly 111 to a stationary bracket 117. The bracket 117 is suitably mounted to the frame 34. The spring 114 provides the resilient connection between the two bell cranks and tends to rotate them in opposite directions, with relation to each other, about the pivot 116. A stop 118 is provided by the cooperating configurations of the bell cranks which limits the expanding action of the spring 114, and maintains the spring and the bell cranks assembled in a predetermined relation.

Figure 13:
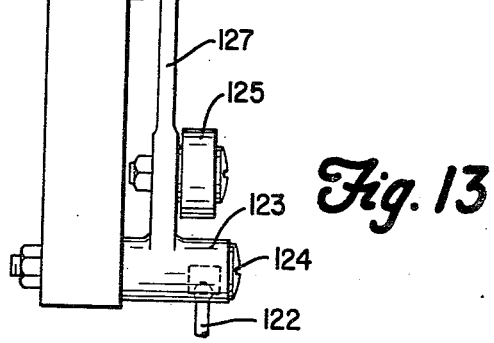
FIG. 13 is a fragmentary plan view of actuating means for the copper segment positioning mechanism.

The bell crank assembly 111 is urged in one direction about the pivot 116 by a second spring 119 positioned between an extending portion of the bracket 117 and an integral pad 121 of the bell crank 112. The assembly is forced in the opposite direction against the action of spring 119 by a rod 122 which transmits motion from the camshaft 30 to the bell crank 112. The rod 122 (FIG. 8) is positioned between the bell crank 112 and a bell crank 123, and is provided with ball and socket connections at both of its ends. The bell crank 123 is pivotally mounted as at 124 to the wall 32 (FIG. 13) of the frame 34 and is provided with a cam follower 125 rotatively mounted thereto. The cam follower 125 cooperates with the cam 44 (FIGS. 2 and 5) transmitting motion through the bell crank 123 and rod 122 to the bell crank assembly 111.

A means is provided to maintain the bell crank assembly 111 inoperative at predetermined periods during the operation of the machine, which will be better understood hereinafter. The bell crank 123 has an integral projection 127 (FIG. 8) which cooperates with one arm of a pivoted lever 128 to maintain the cam follower 125 out of operating contact with the cam 44. The lever 128 is urged counterclockwise to an inoperative position about a pivot 129 by a spring 131, which is anchored to the mounting frame 34 and to an upwardly-projecting portion of the lever 128. A connecting rod 132 is pivotally connected to the lever 128 and to the actuating plunger 133 of a solenoid 134, so that at predetermined periods the solenoid 134 is energized to rotate the lever 128 in a clockwise direction against the spring bias. Clockwise rotation of the lever 128 will cause the lowermost tip 128a of the lever to contact a tip 127a of arm 127 and rotate the bell crank 123 in a counterclockwise direction about its pivot 124. This action will move the cam follower 125 in a downwardly direction clearing the surface of the cam 44. The various parts will remain in inoperative cam clearing position until the bell crank assembly 111 is to operate again, at which time the solenoid 134 will be deenergized, allowing the spring 131 to move the lever tip 128a in a counter-clockwise direction out of the path of travel of the arm 127, so that the follower 125 again cooperates with the cam 44.

Another feed member is provided on the machine in the form of a removable magazine 141 (FIGS. 2, 3, and 8). The magazine 141 provides a means of continuously feeding the mica insulating segments B to the guide track 80. The mica segments are of somewhat larger dimension in their body portion in a radial direction to give a small overhang with reference to the copper segments, which overhang cooperates with the notches and slots in the holding fixture 20, giving it purchase to hold the mica segments firmly in vertical position. A handle 142 is provided which operates a conventional latch mechanism 143, the details of which are not shown, which maintains the magazine 141 in a position (FIG. 14) against the vertical guide member 82. The magazine is readily removed and replaced by rotating the handle 142 (FIG. 8), first clockwise, then counter-clockwise, respectively. A resilient means is provided (not shown) which cooperates with the magazine, so that a force is constantly applied to the stack of mica segments to maintain a segment B (FIG. 10) in an inserting position in the guide track 80 at all times, as indicated by the arrow in FIG. 14.

*Indexing Mechanism*

Figure 15:
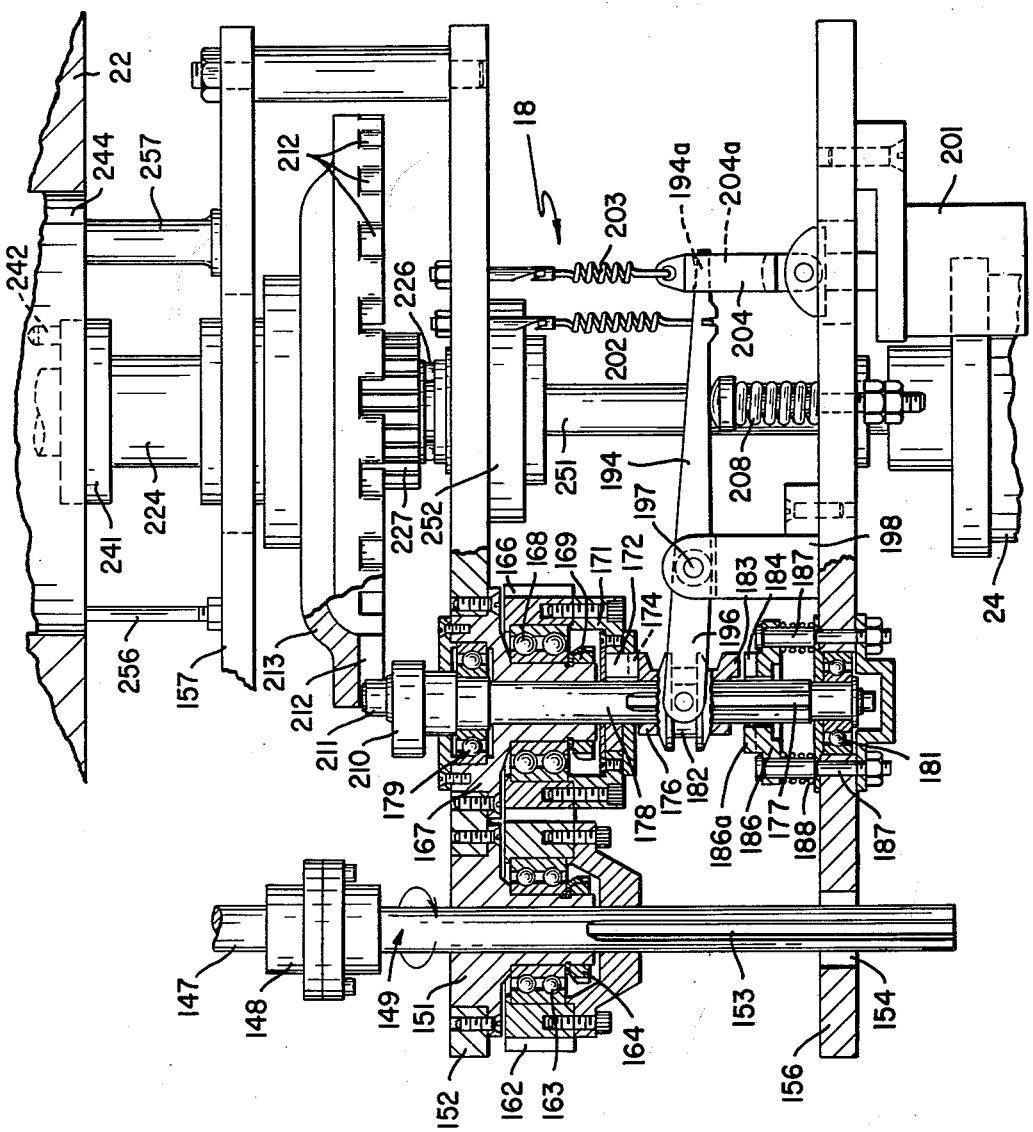
FIG. 15 is a side elevation, partly in section, of the indexing mechanism of the machine.

Returning now to the shaft 38 (FIG. 6), the bevel gear 41 affixed to the shaft meshes with a bevel gear 146 keyed to a vertical shaft 147 (FIGS. 8 and 15). The shaft 147 is connected by a coupling 148 to a second concentric shaft 149 which provides the motive power for the indexing mechanism 18. The shaft 149 is journalled in a bearing member 151 mounted to a horizontal plate 152, and is provided with a spline portion 153 on its lower extremity, which extends through an enlarged aperture 154 provided in a second horizontal mounting plate 156. The two mounting plates 152 and 156, and an upper third plate 157 (FIGS. 2 and 15) are suitably mounted together in spaced relation to provide a frame for the indexing mechanism 18.

The shaft 149 cooperates with a member 161 slidingly positioned on the spline portion 153 which is bolted to a gear 162, and transmits rotative power thereto. The gear 162 is journalled on a depending portion of the member 151 by a suitable ball bearing 163 and is maintained in assembled relation on the member 151 by a threaded nut 164. The gear 162 meshes with and drives a second gear 166 similarly mounted to a member 167 which is also mounted to the plate 152. Gear 166 is journalled on a depending portion of the member 167 with a ball bearing 168 and is maintained in assembled relation by a threaded nut 169. A member 171 is suitably bolted to the bottom of the gear 166 and is provided with an aperture 172 which cooperates in a driving relation with an integral projection 174 provided on a clutch member 176. The clutch member 176 is slidingly positioned on a splined portion 177 of a shaft 178 and provides a means of transmitting rotative motion from the shaft 149 to the shaft 178 through gears 162 and 166. The shaft 178 is journalled in ball bearings 179 and 181 suitably mounted in the member 167 on plate 152 and the plate 156 respectively.

The clutch member 176 is provided with an integral actuating collar 182 and a depending projection 183. The depending projection 183 cooperates with a notch 184 provided in a stop member 186 which provides a means of stopping the rotating motion of the shaft 178 at predetermined times during the operation of the machine. The stop member 186 is mounted to the plate 156 with guide bolts 187 with springs 188 providing a resilient abutment for the clutch member 176 when it is lowered to engage the projection 183 in the notch 184 to stop the shaft 178. When the clutch member 176 is lowered during rotation, the integral projection 183 will bear against a surface 186a of the stop member 186 and compress the springs 188. The compressed springs will provide a snap action when the projection 183 engages the notch 184 insuring a positive stop.

The clutch member 176 is moved up and down on the shaft 178 by a pivoted lever 194 having a bifurcated end 196, which cooperates with the actuating collar 182 of the clutch member by a conventional actuating yoke and collar. The arm 194 is centrally pivoted at 197 to a bracket 198 suitably mounted to the plate 156. A solenoid 201 is provided mounted on the lower side of plate 156 to actuate the arm 194 in a clockwise direction about the pivot 197 against the action of springs 202 and 203 through a connecting link 204, active between the armature of the solenoid on the end of the lever. The end 194a of the arm 194 is slidingly positioned in a slot 204a of the link 204 and provides a lost motion connection between the arm and the link necessary for the abutting action between the clutch projection 183 and the surface 186a of the stop member 186. The spring 203 is connected to the upper end of the link 204 and adjustably anchored to plate 152 and provides a means of retracting an armature 206 of the solenoid 201 when the solenoid is deenergized. The spring 202 is connected to the end of the arm 194 and also adjustably anchored in plate 152 to provide a means of rotating the arm in a counter-clockwise direction. An adjustable spring and plunger assembly 208 is mounted to the plate 156 to provide a resilient bumper for the arm 194 when the arm is rotated in a clockwise direction by the solenoid 201.

When the clutch member 176 is in driving relation with the gear 166, the shaft 178 rotates a cam 210 mounted on its upper end above the plate 152. Eccentrically mounted on the cam 210 is a roller 211 which cooperates with a number of open radial slots 212 formed in the lower face of a horizontal index wheel 213 to rotate the index wheel in a clockwise direction. The number of slots 212 in the wheel 213 is equal to the number of copper segments required in the commutator, in this case twenty-seven slots. The cam 210 cooperates with a cam follower 216 (FIG. 16) mounted on a pivoted lever 217 to actuate a resiliently biased plunger 218 of a locking means. The locking means is provided to prevent rotation of the index wheel at predetermined periods during the operation of the machine, and consists of an integral projection 219 of the plunger 218 which is urged into locking position in the open ends of the slots 212 of the index wheel by a coil spring 221. The projection 219 is moved to a non-locking position by the cam 210 through the pivoted lever 217 and plunger 218.

The wheel 213 is mounted for rotation on a vertical shaft 224 which is journalled in a suitable bearing (not shown) mounted in the plate 157, and a thrust bearing 226 located between the lower end of the shaft 224 and the plate 152. A gear 227 is provided on the lower portion of the shaft 224 to transmit rotary motion to a timing shaft 228 (FIGS. 16 and 17) through an idler gear 229 and a gear 231 mounted on the timing shaft. Also mounted on the timing shaft, in predetermined radial positions, are a number of switch actuating fingers 233 which actuate a number of electrical control switches 234 (FIG. 16), only one of which is shown. The electrical switches 234 are of a conventional variety to control the sequence of operation of the machine and will not be described in detail. The shaft 228 is journalled in suitable bearings 236 and 237 mounted in the plates 152 and 156 respectively.

Figure 18:
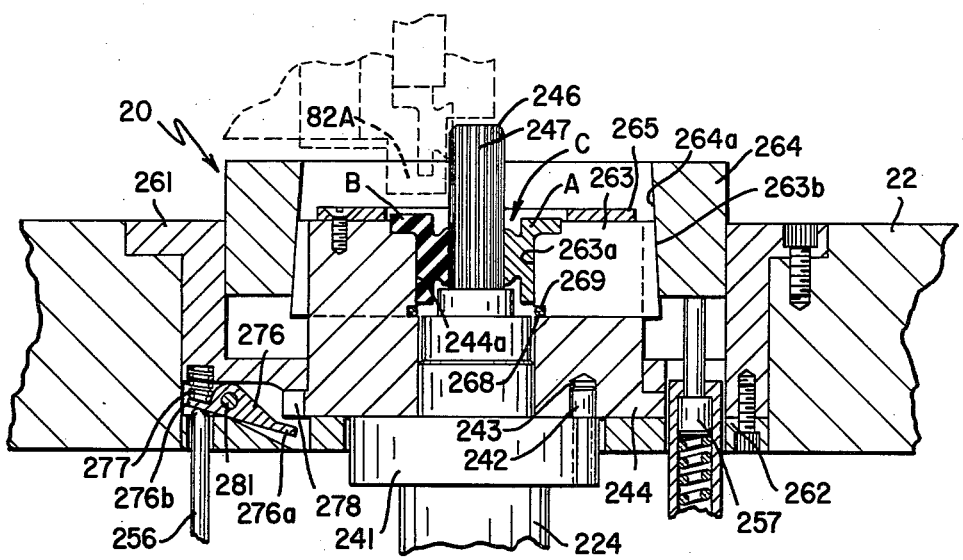
FIG. 18 is a sectional elevation of the special mica and copper segment holding fixture.
Figure 19:
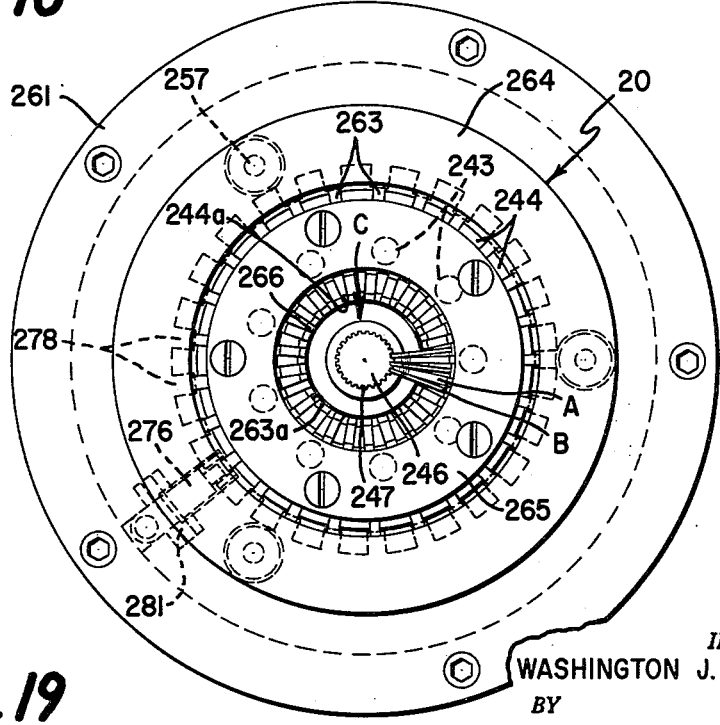
FIG. 19 is a plan view of the mica and copper holding fixture.

Near the upper end of the shaft 224 (FIGS. 15 and 18), an integral flange 241 is provided in which is mounted a projecting driving pin 242, which engages one of a number of holes 243 in the bottom surface of a member 244 which provides a disengageable driving connection to transmit rotary motion from the indexing mechanism 18 to the holding fixture assembly 20 (FIGS. 18 and 19). The shaft 224 terminates in a guide post 246 whose annular surface is provided with a plurality of vertical guide grooves 247 parallel with the axis of the shaft. The number of guide grooves required in the post 246 also depends on the size and kind of commutator to be assembled.

The entire indexing mechanism 18 is raised and lowered to engage or disengage the holding fixture 20 by a fluid actuated cylinder 24 (FIG. 1) mounted to the base member 12. Motion is transmitted to the indexing mechanism from the cylinder 24 by a piston rod 251 (FIG. 15) of the cylinder which is connected to the plate 152 of the indexing mechanism with a connecting flange 252 attached thereto in any suitable manner. The indexing mechanism is guided in its movement in a vertical plane by two vertical guide shafts 253 (FIGS. 1 and 16) diametrically disposed from each other and mounted to the base member 12. The guide shafts 253 extend through two guide sleeves 254 mounted between the plates 152 and 156 of the indexing mechanism and maintain the mechanism in a given vertical relation in a horizontal position. Also mounted on the indexing mechanism, on plate 157 (FIGS. 15 and 18) is a lock actuating pin 256 and a plurality of lift pins 257 that project into the holding fixture 20 when the indexing mechanism is in the "up" position, which will be further described hereinafter.

*Commutator Holding Fixture*

The holding fixture 20 (FIGS. 17A, 18 and 19) comprises an outer mounting ring member 261, a base member 262, a rotating guide member 244, a plurality of wedge members 263, and a wedge ring 264. The base member 262 is bolted to the bottom of the outer ring member 261 which is affixed to the movable table member 20 as shown and maintains the guide member 244 in a rotatable position between the two members by providing a supporting floor on which the guide member is supported. The wedge members 263 are slidably positioned in radial slots 244a in the guide member 244 and are held in their respective slots by a ring 265 bolted to the top surface of the guide member. The assembly of the wedge members 263 and the guide member 244 provides a cavity C into which the copper segments A and the mica segments B are positioned.

The inner ends 263a of the wedge members project slightly further in to the cavity C, during a segment inserting operation, than the inner annular surfaces 244a of the guide member 244. This provides a plurality of shallow vertical slots 266 between the projecting ends of the wedge members 263. The slots 266 are in radial alignment with and cooperate with the vertical grooves 247 in the central guide post 246 to provide a guide means for the longitudinal edges of the mica segments positioned in the cavity C so that the segments are held radially in a vertical position. The vertically positioned mica segments then provide radial walls, which are a guide means and a retaining means for the copper segments positioned between them, the copper segments being of a dimension to fit in the space, which will be better understood from the operational description. When the copper segments A are inserted in the cavity C between the mica segments B held in vertical position by the grooves and the shallow slots, they are directly in line with the wedge members 263. From this it is clear that the dimension of the mica segments are slightly larger than the copper segments to provide extending longitudinal edges which cooperate with slots and grooves in the inner and outer holding means provided and shown in FIG. 17A.

Each of the sliding wedge members 263 has an oblique surface 263b on its outer end (FIG. 18) which cooperates with an inner conical surface 264a of the wedge ring 264. When the ring 264 is moved downwardly the cooperation between these surfaces provides a means of moving the wedge members 263 toward the center of the holding fixture 20, at a predetermined period to compress the assembled commutator elements. A circular spring 268 of ring conformation is provided in a groove 269 of the guide member 244 which bears against the lower edge of the wedge members 263 and resiliently urges the wedge members outwardly against the conical surface 264a of the wedge ring 264. After all the copper and mica segments have been inserted in the holding fixture 20 they are wedged together to form a firm assembled group, which is accomplished by moving the wedge ring 264 downwardly to its lowermost position, thereby urging the wedge members 263 toward the center of the holding fixture and pushing the copper segments into a tight relation with the mica segments. After the copper and mica segments have been wedged together to form a tight assembly the indexing mechanism 18 is lowered withdrawing the central guide post 246 from the assembly. The assembled segments remain in this position in the holding fixture while the fixture is moved by the revolving table 22 to another machine for a further operation.

A fluid actuated cylinder 271 (FIG. 1) provides a means of pressing the wedge ring 264 down by transmitting motion through a link 271a to a bifurcated arm 272 pivotally connected to the wedge ring and to the link. The actuating arm 272 is also pivotally connected to a bracket 273 which is mounted to the movable table 22. Another means is provided, by the lift pins 257 (FIGS. 18 and 19), to raise the wedge ring 264 prior to a new segment-inserting operation. This is accomplished when the indexing mechanism, on which the lift pins are mounted, is raised to the operating position with relation to the guide member 244. The lift pins 257 will contact the bottom surface of the wedge ring and raise the ring to a predetermined horizontal position allowing the ring spring 268 to urge the wedge members 263 outwardly, preparing the cavity C for a segment-inserting operation.

During the inserting operation, the guide member 244 and the central fluted shaft 246 are rotated at predetermined times to position vacant segment spaces of the cavity C in alignment with a depending guide projection 82a of the guide member 82, shown in phantom in FIG. 18. Rotation of the guide member 244 and the shaft 246 is provided by the indexing mechanism 18 when it is in an "up" position and the driving pin 242 is engaged in one of the holes 243 in the guide member 244. After an inserting operation is completed, the indexing mechanism is lowered, retracting the guide post 246, the lift pins 257, and disengaging the driving connection between the indexing mechanism and the guide member 244. When the indexing mechanism is disengaged from the guide member 244, a lock is actuated to prevent accidental rotation of the guide member. This will insure alignment of one of the holes 243 with the driving pin 242 when the holding fixture 20 is returned to the machine for another inserting operation.

The lock comprises a pivoted lever 276 (FIGS. 18 and 19) and a compression spring 277 cooperating with the lever to move it to locking position. One end 276a of the lever 276 engages slots 278 provided around the lower periphery of the guide member 244 to lock the guide member in position by the action of the spring 277. The opposite end 276b of the lever 276 is in contact with spring 277 which urges the arm 276 about a pivot 281 in a counter-clockwise direction to effect the locking position. The arm is disengaged from the slots 278 by the pin 256 mounted to the plate 157 of the indexing mechanism 18. When the indexing mechanism is raised to an operating position the pin 256 will contact the end 276b of the arm 276 and pivot the arm in a clockwise direction about the pivot 281 compressing the spring 277, as shown in FIG. 18.

*Operation of the Machine*

In the operation of the machine, the table 22 positions the holding fixture 20 in the machine under the inserting mechanism, as shown in FIG. 1. At the time the holding fixture 20 is positioned in the machine, the inserting bars 77 and 78 are locked in "up" position by the solenoid controlled latches 88 and 89 engaging the lugs 77A and 78A on the bars, and the indexing mechanism 18 is in "down" position. During the time these various members are in their inoperative positions, the motor 16 is continually driving the cam shaft 30, the shaft 38, and the vertical shaft 147 which drives the indexing mechanism. It is to be remembered that while the inserting bars 77 and 78 are locked in "up" position, the cams 45 and 46 are not actuating the oscillating arms 61 and 62 of the inserting mechanism 14. Also, in the inserting mechaniscm 14, the solenoid 134 (FIGS. 8 and 12) is keeping the cam follower 125 out of contact with the cam 44 which maintains the positioning arm 111, controlling movement of the copper segments, in an idle state. Because the clutch member 176 (FIG. 15) of the indexing mechanism 18 is disengaged from the gear 166, the indexing mechanism also remains idle but the gear 166 continues to rotate, being driven by the shaft 147.

Immediately after the holding fixture 20 has been positioned in the machine, the indexing mechanism 18 is automatically raised to the operating position by the fluid actuated cylinder 24 (FIG. 15). When the indexing mechanism is raised, the lift pins 257 (FIG. 18) will raise the wedge ring 264 allowing the ring spring 268 to expand and retract the wedge members 263. As the wedge ring 264 is being raised, the driving pin 242 is engaging one of the holes 243 in the bottom of the guide member 244 to form the driving relation, and the locking lever 276 is being disengaged from the slots 278 in the periphery of the guide member 244 by the vertical pin 256. When the indexing mechanism reaches its maximum raised position, the guide post 246 is in its operative guiding position with relation to the projection 82a (FIGS. 3 and 4) of the guide member 82 and with relation to the guide slots 266 (FIG. 19) of the cavity C.

Immediately after the indexing mechanism reaches its raised operating position, conventional automatic electric controls (not shown) will be energized, and the machine will begin operating.

As stated hereinabove, the mica segments B provide the means to guide and retain the smaller copper segments A in the holding fixture 20. The first operation of the commutator assembling cycle is to energize the solenoid 96 to disengage the pawl 88 (FIG. 8) from the lug 77a to release the mica inserting bar 77 and allow the cam 45 and the spring 58 (FIG. 3) to oscillate the arm 61 which reciprocates the bar 77 in its vertical guide to insert the mica segments B in the space C of the holding fixture 20, between the inner and outer holding means. Simultaneously with the energizing of the solenoid 93, the solenoid 201 is also energized to engage the clutch member 176 (FIG. 15) with the gear 166 and begin operation of the indexing mechanism. The cam follower 72 will engage the cam 45 and the oscillating arm 61 will begin to operate and cause the inserting bar 77 to reciprocate to insert a mica segment into the cavity C in the notches of the post 246 and the slots 266 (FIG. 17A), which embrace the edges of the mica insulating segments. By the time the mica segment is inserted, the roller 211, being rotated by the shaft 178 of the indexing mechanism (FIG. 15), will engage another slot 212 of the indexing wheel 213 and rotate the holding fixture guide member 244 in a clockwise direction. The roller 211 will travel about the axis of the shaft 178, in and out of the various radial slots 212, and move the wheel 213 intermittently so that the guide member 244 and the holding fixture 20 are rotated to a new position and held stationary for another segment inserting operation in the new position.

By the time the wheel 213, the guide member 244 and the holding fixture 20 rotate to the new position and become stationary, the inserting bar 77 is being actuated to insert another mica segment in the space C. After the second mica segment is inserted in vertical position in the holding notches and slots, the indexing operation will be repeated to rotate the guide member 244 and holding fixture 20 to a third position and a third mica segment is inserted. When the first three mica segments have been positioned in vertical radial spaced relation in the cavity C, the guide member 244 and the fixture 20 are rotated to a fourth radial position, so that the space between the first two mica segments is directly under the copper segment guide track 81. Because of the overall width of the inserting guide track member 82 and its related members, it is necessary to insert three mica segments in the fixture 20 before the space between the first two mica segments is in line with the copper segment inserting bar for the insertion of the first copper segment.

When the machine reaches this stage in its cycle, the solenoid 97 (FIG. 2) will be energized to disengage the pawl 89 from the copper segment inserting bar 78. The solenoid 134 (FIG. 8) will be deenergized simultaneously allowing the spring 131 to move the lever 128 from the path of the arm 127 to allow the cam follower 125 to engage the cam 44 to oscillate the bell crank 123 which actuates the copper segment positioning lever 111 (FIGS. 8 and 12). The timing of the machine is such that when the solenoid 97 is energized to free the inserting bar 78, the oscillating levers 61 and 62 will begin to operate simultaneously to reciprocate the bars 77 and 78 to insert a mica and a copper segment into the holding fixture 20 at the same time. The machine will continue to operate in this fashion and the indexing operation will be repeated, as described, after each inserting operation until a predetermined number of mica segments have been positioned in the holding fixture to fill the required holding notches and slots for the mica segments.

With this sequence of inserting three mica segments first, then inserting mica and copper segments simultaneously thereafter, two spaces between mica segments are always provided before inserting a copper segment. It will be obvious, when analyzing the sequence, that after the required number of mica segments have been positioned in the holding fixture (in this case twenty-seven), three copper segment spaces between the last mica segments will remain open. At this stage of the assembling cycle, the solenoid 96 (FIG. 2) is deenergized allowing the bellcrank 91 to be rotated by its biasing spring 101, so that the pawl 88 will engage the mica-inserting bar 77. This will hold the inserting bar 77 in inoperative position while the other inserting bar 78 continues to insert the last three copper segments into the holding fixture in the three remaining open spaces between the mica segments.

This completes the first portion of the assembly cycle with the required number of mica and copper segments having been positioned in the holding fixture 20. The automatic control system will then deenergize the solenoid 97 to hold the second inserting bar 78 in inoperative position by the pawl 89. The solenoid 134 will be energized (FIG. 8) to idle the copper segment positioning arm 111 by the action already described. The cylinder 271 (FIG. 1) will be actuated to lower the wedge ring 264 and cause the slideable wedge members 263 to push the copper segments towards the center of the holding fixture into a snug relation with the mica segments, providing a compact assembly. The solenoid 201 (FIG. 15) will then be deenergized so that the clutch 176 will be disengaged from the gear 166 in the indexing mechanism. The indexing mechanism 18 will then be lowered by the cylinder 24 (FIG. 1) to disengage the driving connection to the holding fixture 20, and the guide post 246, pin 256, and lift pins 257 will be retracted to clear the table 22. As the indexing mechanism is lowered, the pivoted lever 276 (FIG. 18) will rotate about its pivot into engagement with the slot 287 and lock the guide member 244 in position. FIG. 20 shows how the assembled copper and mica segments would appear if they were removed from the holding fixture following this final wedging operation.

After the segments are assembled as described, they will be retained in the holding fixture by the wedge ring 264 while the table 22 rotates to move the holding fixture to another machine for a further assembling operation. As the table rotates, a filled holding fixture 20 is moved from the assembly position described, to another position while an empty fixture will be positioned at the assembly point. When the filled holding fixture leaves the machine, the guide member 244 will be retained in the same position by the locking lever 276 until the same holding fixture again returns empty to the machine.

The guide member 244 is provided with a sufficient number of driving holes 243 to compensate for its change in position when the last three copper segments are inserted to complete the assembly operation.

When the next holding fixture is moved into operating position in the machine, the automatic controls will be actuated and an identical sequence of operations will be repeated. It is to be remembered that the invention discloses a machine to be used in a continuous operating production line, and that the machine assembles copper and mica segments only and not an entire commutator, which is accomplished at later operating stations.

It is to be understood that the above detailed description of the present invention is intended to disclose an embodiment thereof to those skilled in the art, but that the invention is not to be construed as limited in its application to the details of construction and arrangement of parts illustrated in the accompanying drawings since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. In a device of the class described, a central means for embracing and holding the inner edge of an insulating segment of a commutator, an outer concentric holding means for embracing and holding the outer edge of the insulating segment, said inner and outer holding means cooperating together to hold a number of insulating segments in spaced relation along radial lines and means for holding conducting commutator segments in the space between the insulating segments held in vertical position by the inner and outer holding means.

2. In a device of the class described, a movable central means for embracing and holding the inner edges of mica segments of a commutator, an outer concentric holding means for embracing and holding the outer edges of the mica segments, said inner and outer holding means cooperating together to hold a number of mica segments in spaced vertical relation along radial lines, means for holding copper commutator segments in the spaces between the spaced mica segments, and means to compress the segments held in vertical position by the inner and outer holding means.

3. In a device of the class described, a vertically removable central means for embracing and holding the inner edge of a mica segment of a commutator in a vertical position, an outer concentric holding means for embracing and holding the outer edge of the mica segment having portions which are movable in a radial direction, said inner and outer holding means cooperating together to hold a number of mica segments in spaced vertical relation along radial lines, means for holding copper commutator segments in the space between the mica segments held in vertical position by the inner and outer holding means, means for moving the movable portions of the outer holding means to compress the segments, and means for removing the central holding means in a vertical direction.

4. In a device of the class described, a central means for embracing and holding the inner edge of a mica segment of a commutator, an outer concentric holding means for embracing and holding the outer edge of the mica segment, said inner and outer holding means cooperating together to hold a number of mica segments in spaced relation along radial lines, means for holding cooper commutator segments in the space between the mica segments held in vertical position by the inner and outer holding means, means to insert the mica segments between the central and outer holding means, and means for inserting the copper segments in position between the cooperative central and outer holding means.

5. In a device of the class described, a vertically removable central means for embracing and holding the inner edge of a mica segment of a commutator in a vertical position, an outer concentric holding means for embracing and holding the outer edge of the mica segment having portions which are movable in a radial direction, said inner and outer holding means cooperating together to hold a number of mica segments in spaced vertical relation along radial lines, means for holding copper commutator segments in the space between the mica segments held in vertical position by the inner and outer holding means, means for inserting the mica segments in position between the cooperative inner and outer holding means, means for inserting the copper segments between the held mica segments, means for moving the movable portions of the outer holding means to compress the segments, and means for removing the central holding means in a vertical direction.

6. In a device of the class described, a central means for embracing and holding the inner edge of a mica segment of a commutator, an outer concentric holding means for embracing and holding the outer edge of the mica segment, said inner and outer holding means cooperating together to hold a number of mica segments in spaced relation along radial lines, means for holding copper commutator segments in the space between the mica segments held in vertical position by the inner and outer holding means, means for inserting the mica segments in position between the cooperative inner and outer holding means, and means for inserting the copper segments in the space between the already inserted mica segments.

7. In a device of the class described, a central means for embracing and holding the inner edge of a mica segment of a commutator, an outer concentric holding means for embracing and holding the outer edge of the mica segments, said inner and outer holding means cooperating together to hold a number of mica segments in spaced vertical relation along radial lines, means for holding copper commutator segments in the space between the mica segments held in vertical position by the inner and outer holding means, means for inserting the mica segments in position between the cooperative inner and outer holding means, means for inserting the copper segments in the spaces between the already inserted mica segments, and means to compress the assembled segments to form a commutater sub-assembly.

References Cited in the file of this patent

UNITED STATES PATENTS

| | | |
|---|---|---|
| 2,251,326 | Cullin | Aug. 5, 1941 |
| 2,634,495 | Callsen | Apr. 14, 1953 |
| 2,729,882 | Goodwin | Jan. 10, 1956 |
| 2,736,087 | Stevens | Feb. 28, 1956 |
| 2,755,538 | Kirsch | July 24, 1956 |
| 2,795,841 | Eppich | June 18, 1957 |